Feb. 21, 1928. 1,659,609
H. NELSON
STEAM GENERATOR
Filed April 3, 1926 2 Sheets-Sheet 2

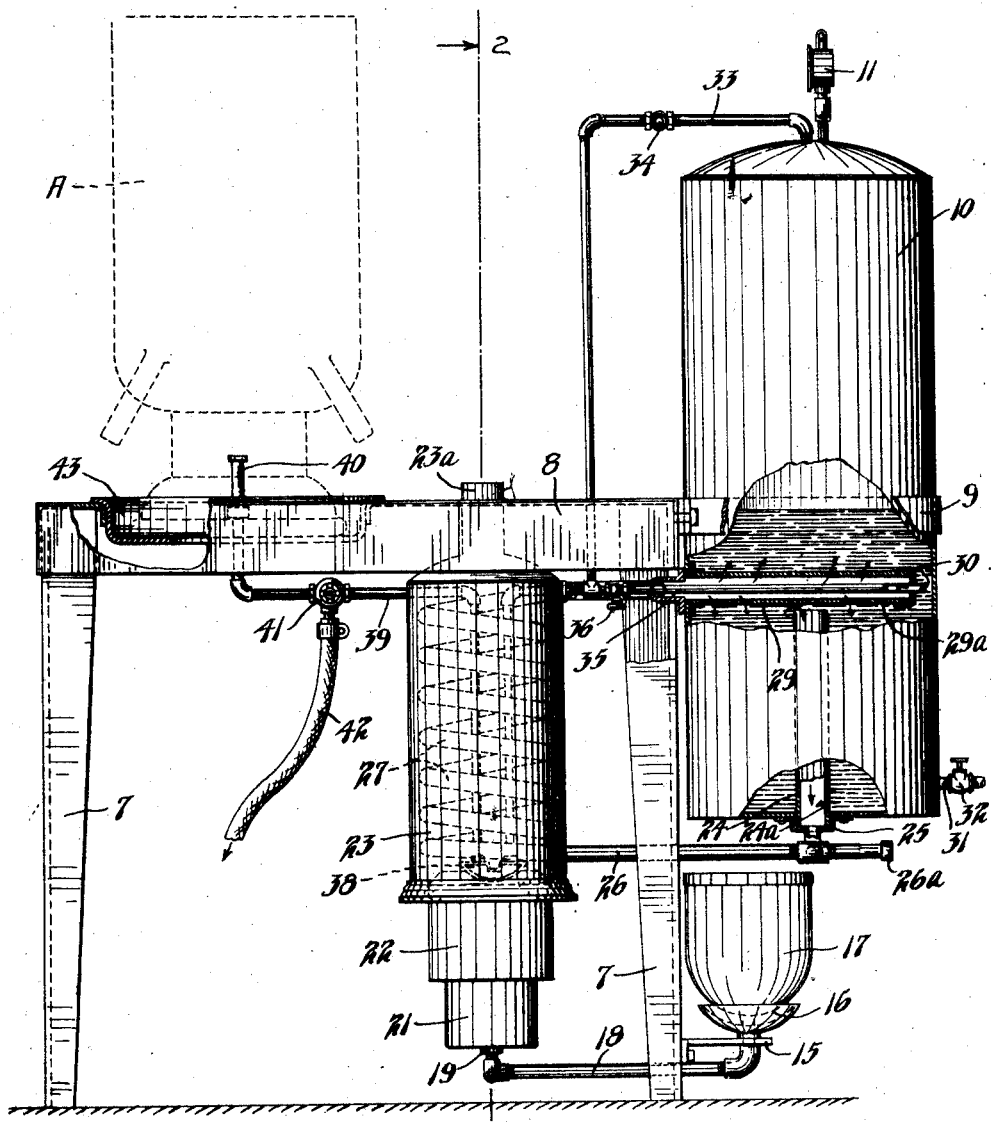

Inventor
HENRY NELSON.
By his Attorneys
Williamson Reif & Williamson

Patented Feb. 21, 1928.

1,659,609

UNITED STATES PATENT OFFICE.

HENRY NELSON, OF GWINNER, NORTH DAKOTA.

STEAM GENERATOR.

Application filed April 3, 1926. Serial No. 99,600.

This invention relates to a steam generator and particularly to a steam generator which may be used for cleaning milk, cream and ice cream cans. Milk, cream and ice cream are now handled in bulk at creameries by placing the same in cans, and it becomes necessary for the creameries to clean these cans. It has been found that to most effectively clean the cans the same must be first washed with boiling water and saturated steam and then sterilized and dried by means of super-heated steam at a relatively high temperature.

It is an object of this invention therefore to provide a steam generator which will provide means for supplying hot water and saturated steam and also will provide means for supplying super-heated steam.

It is another object of the invention to provide in a steam generator, an efficient means for rapidly generating steam in a steam tank.

A further object of the invention is to provide a steam generator having a hot water and steam tank, heating means, and means for creating a continuous circulation of the hottest water in the tank through the heating means to rapidly generate steam in the tank.

Still another object of the invention is to provide a steam generator having a hot water and steam tank, a fuel burner, means for heating the water in the tank, and a chamber adapted to super-heat steam discharged from the tank or to additionally heat water discharged from the tank.

These and other objects and advantages of the invention will more fully appear from the following description made in connection with the accompanying drawings in which like reference characters refer to the same or similar parts throughout the various views, and in which:

Fig. 1 is a view in side elevation of the device, certain parts thereof being broken away;

Figure 3:
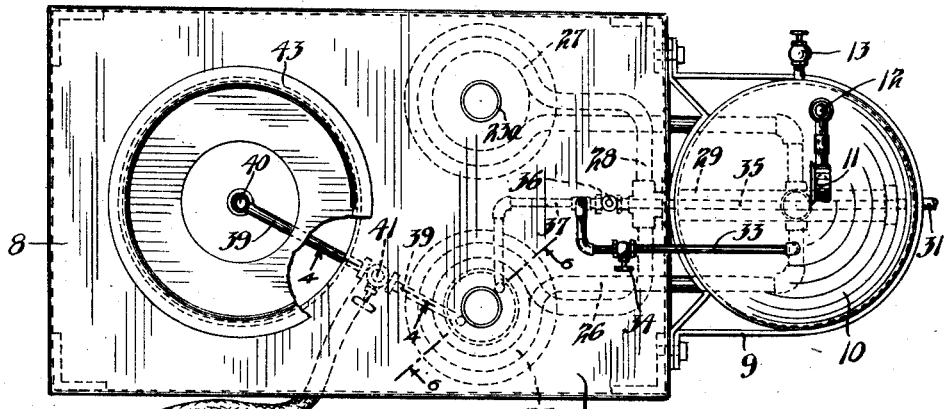
Fig. 3 is a plan view of the device, certain of the parts being broken away.

Referring to the drawings, a platform or table is provided having legs 7 and top 8. Secured to one end of the table by means of the band 9 is the hot water and steam tank 10 having a steam gauge 11 and pressure valve 12 of standard construction at the top thereof and the water glass 13 of standard construction placed at one side of the tank at substantially the center thereof. A transverse bar 14 is secured to the lower portions of the legs 7 at the tank end of the table, and has secured thereto the bracket 15 supporting the fuel tank holder 16. A fuel tank 17 of standard construction is adapted to rest upon the fuel tank holder 16. Fuel supply conduit 18 extends from the fuel tank holder 16 to the master fuel burner 19 and the auxiliary fuel burner 20. The fuel burners 19 and 20 are of any standard type and support the burner casing 21, which in turn supports the heat directing casing 22. Heater coil casings 23 are placed above the casings 22 and are supported from the top 8 of the table and have flues 23ª extending through the top of the table.

A casing 24 extends from adjacent the central portion of the tank 10 downwardly through the bottom of the tank and is secured to the tank by means of the bracket 25. Casing 24 is open ended and has an aperture 24ª adjacent its lower end within the tank. A conduit 26 having the drain plug 26ª screwed in a portion thereof leads from the lower end of the casing 24 to the interior of the coil casings 23 where it is connected by suitable fittings to the lower ends of the heating coils 27 situated in the casings 23 over the burners 19 and 20 respectively. The upper ends of the heating coils are connected to the conduit 28, which communicates with casing 29 extending into the tank 10 adjacent the central portion of the tank and slightly above the conduit 24. The casing 29 is supported in the tank by suitable brackets and has a cap 30 attached thereto at its interior end and a plurality of apertures 29a formed therein on its surface. A water supply conduit 31 adapted to be connected to some source of water supply and controlled by a valve 32 is connected to the tank 10 preferably adjacent the bottom thereof.

Figure 4:
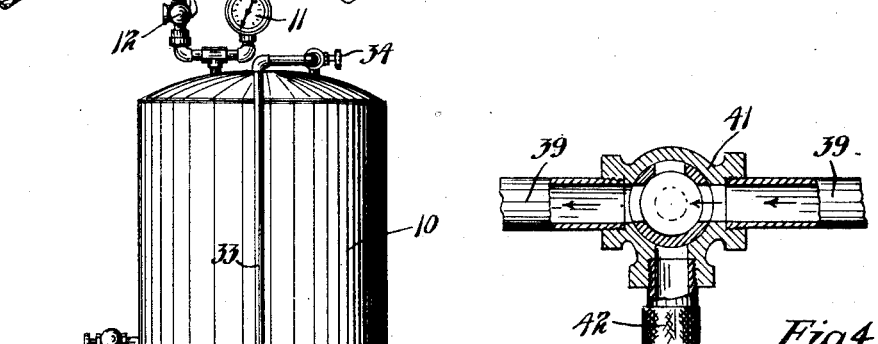
Fig. 4 is a section taken on the line 4—4 of Fig. 3, as indicated by the arrows, and showing the inventor's two way valve in one position.
Figures 2, 5, 6:
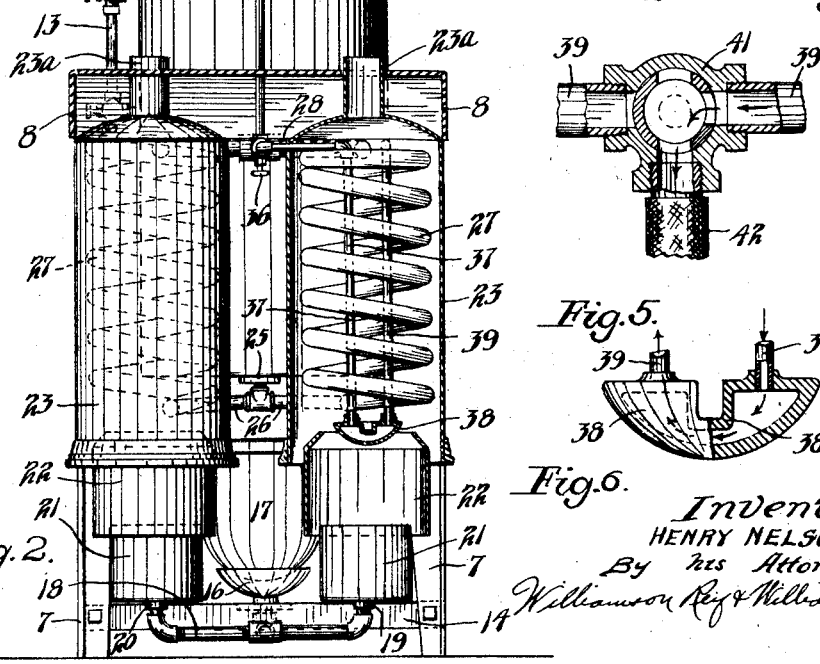
Fig. 2 is a vertical section taken on the line 2—2 of Fig. 1, as indicated by the arrows.
Fig. 5 is a view similar to Fig. 4 showing the two way valve in another position.
Fig. 6 is a view in side elevation showing the inventor's super-heating chamber, certain parts thereof being broken away.

A steam discharge conduit 33 having the control valve 34 therein leads through the upper portion of the tank preferably at the top thereof for the discharge of steam therefrom. A hot water discharge conduit 35 having the control valve 36 therein preferably extends through the central portion of the casing 29 and cap 30, and has an open end communicating with the interior of the tank. A three way fitting connects conduits 33 and 35 with conduit 37. Conduit 37 extends downwardly through the central open portion of the heating coil above the master burner 19 and has secured thereto at its lower end below the heating coil 27 at a point directly above the master burner the chamber 38. Chamber 38 is in the shape of a hollow truncated section of a sphere and has two threaded hubs on its upper truncated surface at opposite sides thereof, one of which is adapted to receive the threaded end of the conduit 37, the other of which is adapted to receive the threaded end of the outlet conduit 39. Between the two hubs on the chamber 38, a transverse grooved portion 38a is formed. The outlet conduit 39 extends upwardly from the chamber 38 and communicates with the hot water and steam nozzle 40 at the end thereof, the nozzle 40 extending upwardly through the top 8 of the table. A two way valve designated generally by the numeral 41 is placed in the outlet conduit 39 and is adapted to control the discharge of steam and hot water into the nozzle 40 and the steam hose 42 communicating with one passage in the valve. The two way valve 41 is illustrated in Fig. 4 of the drawings as being turned to such a position as to permit communication between the outlet conduit 39 and the steam nozzle 40 and to close communication between conduit 39 and steam hose 42. In Fig. 5 the two way valve is shown turned to such a position as to close communication between the outlet conduit 39 and the steam nozzle 40 and to permit communication between the outlet conduit 39 and the steam hose 42. The valve can also be turned to permit communication between the conduit 39 and both the nozzle 40 and hose 42. The top 8 of the table has a circular aperture formed therein about the steam nozzle 40 within which drip pan 43 is adapted to be placed, the drip pan 43 being provided with a central aperture to permit the removal therefrom of hot water and dirt. In Fig. 1 of the drawings an inverted milk can A illustrated in dotted lines is shown placed in position for cleaning resting on the drip pan over the nozzle.

Operation.

The valve 32 is first operated to permit the tank 10 to be filled about half full of water as indicated in Fig. 1 of the drawings, the level of the water in the tank being determinable by an inspection of the water glass 13. The tank is kept about half full of water at all times so as to maintain an approximately constant water level in the tank. The two burners 19 and 20 are next lit, the burners being supplied with fuel from the tank 17 through the fuel inlet conduit 18. Coils 27 will be heated by the burners 19 and 20 and water will circulate from adjacent the top water level in the tank through the casing 24, conduit 26, to the lower ends of the coils 27, upwardly through the coils 27 and back into the tank 10 through conduit 28 and casing 29. The hot water and steam generated will be discharged into tank 10, through the plurality of apertures 29a in casing 29, the apertures in the casing serving to muffle the noise that would otherwise arise from such a discharge. Due to the position of the conduits 24 and 29 within the tank adjacent the water level therein, and due to the fact that the hottest water in the tank will naturally rise to the top water level therein, a continuous circulation of the hottest water in the tank will be obtained through the heating coils. Steam will therefore be very quickly generated within the tank 10. After the generating process has gone on for some time, and the desired pressure of steam has been obtained within the tank, as may be observed from pressure gauge 11, the auxiliary burner 20 may be turned off and the master burner 19 will carry on the generation process. The valve 36 may now be opened, and the valve 34 closed to permit hot water adjacent the top water level in the tank to circulate through the conduit 35, conduit 37, chamber 38, and outlet conduit 39, and by proper adjustment of the two way valve 41 to either the steam hose 42 or the steam nozzle 40. Part of the hot water circulating through this system will be converted in chamber 38 into saturated steam at relatively low pressure; the remaining water will be raised to the boiling point if not already so heated. Saturated steam and boiling water may then be discharged from either the nozzle 40 or the steam hose 42, as desired. When a milk can is desired to be cleaned it will be placed over the steam nozzle 40 and steam and hot water will be projected upwardly from the nozzle 40 to the inner side of the can to properly clean the same. Steam and hot water may be run through the steam hose to clean the outside of the can.

When it is desired to sterilize and dry a milk can the valve 36 will be shut off and valve 34 opened. Saturated steam from the top of the tank will then circulate through the conduit 33, conduit 37 and into chamber 38. The steam will be superheated within the chamber 38 to raise the temperature thereof higher than the temperature of the steam in the tank and accordingly to raise the pressure thereof. The steam so superheated will be discharged from chamber 38 through outlet conduits 39 and either the steam nozzle 40 or the hose 42 as desired, where it may be applied to milk cans. This steam accordingly will not be fully saturated and will be of the proper type to sterilize milk cans and dry the same.

It is possible to supply merely hot water, or any combination of hot water and steam at the same temperature as the steam in the tank from either the steam nozzle 40 or the steam hose 42. If this is desired the burner 20 may be lit to carry on the generation process and the burner 19 turned off. To supply hot water alone to the nozzle 40 or hose 42, valve 34 will be shut off and valve 36 opened. To supply a mixture of hot water and saturated steam to the nozzle 40 or the hose 42, the two valves 34 and 36 may both be partially opened. To supply steam alone, valve 36 will be turned off and the valve 34 opened.

By means of the return circulation feature of the device, steam can very quickly be generated in the tank. After steam has once been generated in the tank practically any desired combination of steam and hot water can be supplied through the steam outlet 39, at practically any desired pressure. Hot water alone can be supplied, hot water and saturated steam at varying pressures may be supplied, saturated steam alone may be supplied, and super-heated steam alone may be supplied. There will be no danger at any time so long as any water remains in the tank that the heating coils 27 will burn out. The aperture 24$^a$ in the lower portion of conduit 24 acts as a drain for the tank, and will insure the supply of water through the heating coils. The tank can be cleaned and drained at any time by unscrewing the drain plug 26$^a$. The grooved portion 38$^a$ in the chamber 38 will act to cause steam or hot water to circulate under the grooved portion, thereby permitting the intense and rapid heating of but a small portion of the steam or the hot water at one time.

Although the device is particularly adapted for use in connection with the cleaning of milk cans and like articles, the same may be used for supplying steam for any purpose, such for example, as for washing automobiles, for cleaning clothes, etc.

The device is simple in construction and comprises but comparatively few parts. The device has been successfully operated in actual practice and has been found by considerable actual usage to be very efficient for the purposes set forth.

It is understood that various changes may be made in the form, details, arrangement and proportions of the various parts without departing from the scope of applicant's invention, which, generally stated, consists in the matter shown and described and set forth in the appended claims.

What is claimed is:

1. A steam generator comprising a hot water and steam tank, a fuel burner, a heating coil over said burner, a steam discharge conduit extending from the steam portion of said tank, a hot water discharge conduit extending from the hot water portion of said tank, a conduit receiving from said discharge conduits, a heating chamber over said fuel burner to which said last mentioned conduit delivers, an outlet from said chamber, and means for regulating said steam discharge and water discharge conduits to supply any desired mixture of hot water and steam to said heating chamber when said generator is in operation, whereby superheated steam at desired temperatures, saturated steam at desired temperatures, hot water or a mixture of hot water and saturated steam may be discharged from said outlet in said chamber.

2. A steam generator comprising a hot water and steam tank, a fuel burner, a heating coil over said burner adapted to heat the water in said tank, a valve controlled steam discharge conduit extending from the steam portion of said tank, a valve controlled hot water discharge conduit extending from the hot water portion of said tank, a conduit receiving from said discharge conduits, a heating chamber over said fuel burner to which said last mentioned conduit delivers, and an outlet from said chamber, whereby when said generator is in operation either the valve of said steam discharge conduit may be opened and the valve of said water discharge conduit closed to supply superheated steam to said outlet, or the valve of said water discharge conduit may be opened to supply hot water and saturated steam to said outlet.

3. A steam generator comprising a water and steam tank, a burner for heating the water in said tank, means for discharging steam from said tank, means for discharging water from said tank, a conduit into which said two means empty, a superheater chamber over said burner to which said conduit leads, said superheater having a constricted area at the lower end thereof situated directly over said burner through which all steam or water from said conduit must pass, and a conduit beyond said constricted area permitting the discharge of steam from said superheater.

4. A steam generator comprising a hot water and steam tank, a fuel burner, a heating coil above said fuel burner, means for causing a continuous circulation of the hottest water in said tank through said heating coil and back to said tank, a discharge conduit from said tank extending downwardly through said coil, a heating chamber directly above said burner, below said heating coil and connected at one side to said conduit, an upwardly extending outlet conduit connected to the other side of said chamber, there being a downwardly extending grooved portion in said chamber forming a constricted opening therein between the two sides thereof connected to said conduits.

5. A steam generator comprising a hot water and steam tank, a master fuel burner, an auxiliary fuel burner, means over said burners for heating water in said tank, a valve controlled steam discharge conduit extending from the steam portion of said tank, a valve controlled water discharge conduit extending from the water portion of said tank, a heating chamber above said master fuel burner, a conduit receiving from said discharge conduits and leading to said heating chamber, and an outlet from said heating chamber, whereby in operation said auxiliary burner may be lit to furnish hot water and steam in said tank and said discharge conduits may be controlled to supply any desired mixture of saturated steam and water to said outlet, or said master burner may be lit and said discharge conduit controlled to supply super-heated steam to said outlet or a mixture of hot water and saturated steam at higher temperature than the steam in said tank at said outlet.

6. A steam generator, comprising a water and steam tank, a burner for heating the water in said tank, means for discharging steam from said tank, means for discharging hot water from said tank, a main conduit into which both of said means lead, a super-heater chamber over said burner, said chamber being of hollow substantially semi-spherical shape and having a transverse depressed channel portion formed on its plane surface to form a constricted area in the interior of said chamber directly over the burner, said main conduit discharging in said chamber at one side of said channel portion and an outlet conduit leading from the said chamber at the opposite side of said channel portion, whereby all steam or hot water discharged from said first mentioned means will pass through said constricted area.

In testimony whereof I affix my signature.

HENRY NELSON.